United States Patent [19]

Asai et al.

[11] Patent Number: 5,606,326
[45] Date of Patent: Feb. 25, 1997

[54] HIGH GAIN PORTABLE RADIO SELECTIVE CALL RECEIVER

[75] Inventors: Takayuki Asai, Tokyo; Masaharu Yagi, Shizuoka, both of Japan

[73] Assignee: NEC Corporation, Japan

[21] Appl. No.: 384,231

[22] Filed: Feb. 6, 1995

Related U.S. Application Data

[63] Continuation of Ser. No. 11,177, Jan. 29, 1993, abandoned.

[30] Foreign Application Priority Data

Jan. 29, 1992 [JP] Japan .................................. 4-038826

[51] Int. Cl.⁶ ...................................................... H01Q 1/24
[52] U.S. Cl. ............................................................... 343/702
[58] Field of Search ..................... 343/702, 700 MS File, 343/906; 439/894; H01Q 1/24, 1/38

[56] References Cited

U.S. PATENT DOCUMENTS

| | | | |
|---|---|---|---|
| 4,490,579 | 12/1984 | Godoshian | 179/2 E |
| 4,491,978 | 1/1985 | Nagata et al. | 455/338 |
| 4,651,312 | 3/1987 | Honma et al. | 343/702 X |
| 4,899,118 | 2/1990 | Polinski, Sr. | 333/246 |
| 4,920,353 | 4/1990 | Mori et al. | 343/702 |
| 4,939,792 | 7/1990 | Urbish et al. | 343/702 X |
| 5,006,822 | 4/1991 | Reddy | 333/112 |
| 5,065,502 | 11/1991 | Amante | 361/402 X |
| 5,182,568 | 1/1993 | Stamps, Jr. et al. | 343/702 |
| 5,363,114 | 11/1994 | Shoemaker | 343/906 X |

FOREIGN PATENT DOCUMENTS

62-42534  9/1987  Japan .

OTHER PUBLICATIONS

Hall et al, "The ARRL Antenna Book," 1983, pp. 3-1; 3-2, Fig. 1.
Hall et al, "The ARRL Antenna Book", pp. 2-27-30 1983.

*Primary Examiner*—Donald T. Hajec
*Assistant Examiner*—Steven Wigmore
*Attorney, Agent, or Firm*—Ostrolenk, Faber, Gerb & Soffen, LLP

[57] ABSTRACT

A radio selective call receiver capable of improving an antenna property by connecting a first circuit board on a high frequency side and a second circuit board on a low frequency side by using a microstrip line. On the first circuit board, a component mounting part including an antenna, an antenna tuning circuit and a high frequency circuit part operated by a frequency resonant with an antenna tuning frequency is mounted, and on the second circuit board, another component mounting part including a low frequency circuit part operated by a lower frequency than the antenna tuning frequency is mounted. The first and second circuit boards are connected by a flexible circuit board provided with the microstrip line having a high impedance with the antenna tuning circuit.

7 Claims, 8 Drawing Sheets

HIGH GAIN PORTABLE RADIO SELECTIVE CALL RECEIVER

This is a continuation of application Ser. No. 08/011,177, filed on Jan. 29, 1993, now abandoned.

BACKGROUND OF THE INVENTION

The present invention relates to a portable radio selective call receiver and more particularly to a UHF band portable radio selective call receiver having a an antenna and receiving electric parts positioned in closely together.

Description of the Related Arts

Figure 1:
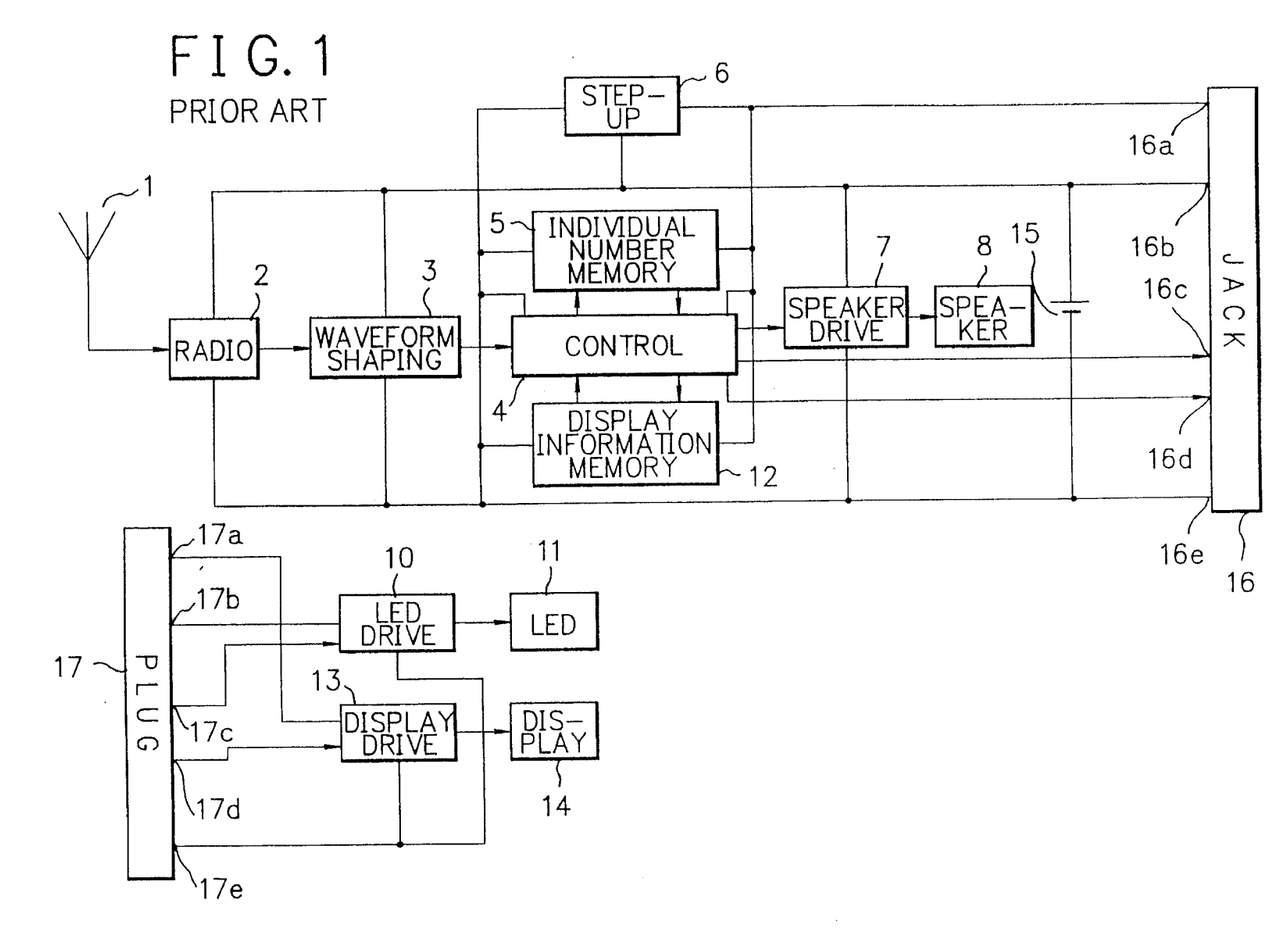
FIG. 1 is a block diagram of a conventional radio selective call receiver.

FIG. 1 shows a conventional UHF band radio selective call receiver. In FIG. 1, a UHF band radio signal received by an antenna 1 is amplified in a radio section 2 and is then demodulated in a waveform shaping section 3. In a control section 4, the demodulated signal output from the waveform shaping section 3 is compared to a unique identification number previously stored in a readable individual number memory 5, and, when they are the same, a sound signal is output to a speaker drive circuit 7 and a light signal is also output to a LED drive circuit 10 via a terminal 16c of a jack 16 and a terminal 17c of a plug 17. The speaker drive circuit 7 amplifies the input sound signal to drive a speaker 8 to output a call sound, and the LED drive circuit 10 amplifies the light signal to flash a LED 11.

Further, when the received signal includes a display information signal, the control section 4 picks up the display information signal to apply it to a display drive circuit 13 via a terminal 16d of the jack 16 and a terminal 17d of the plug 17. The display drive circuit 13 processes the display information signal to display on a display it 14.

In this case, the display information signal is a signal having a sufficiently low frequency component compared with a UHF band frequency in a similar manner to the sound signal and the light signal. The display information for the display information signal is stored in a display information memory 12.

The control section 4 can be constructed by a microprocessor and a ROM (read only memory) storing a control program or by a logic circuit composed of a random logic. A battery 15 is a power source of the radio selective call receiver and supplies the necessary power for the operation of the radio section 2, the LED drive circuit 10 and the like. A step-up circuit 6 steps up the voltage of the battery 15 to apply a raised voltage for operation to the control section 4, the display drive circuit 13 and the like. The power is supplied to the LED drive circuit 10 via a terminal 16b of the jack 16 and a terminal 17b of the plug 17, and the raised voltage is applied to the display drive circuit 13 via a terminal 16a of the jack 16 and a terminal 17a of the plug 17.

Figure 2:
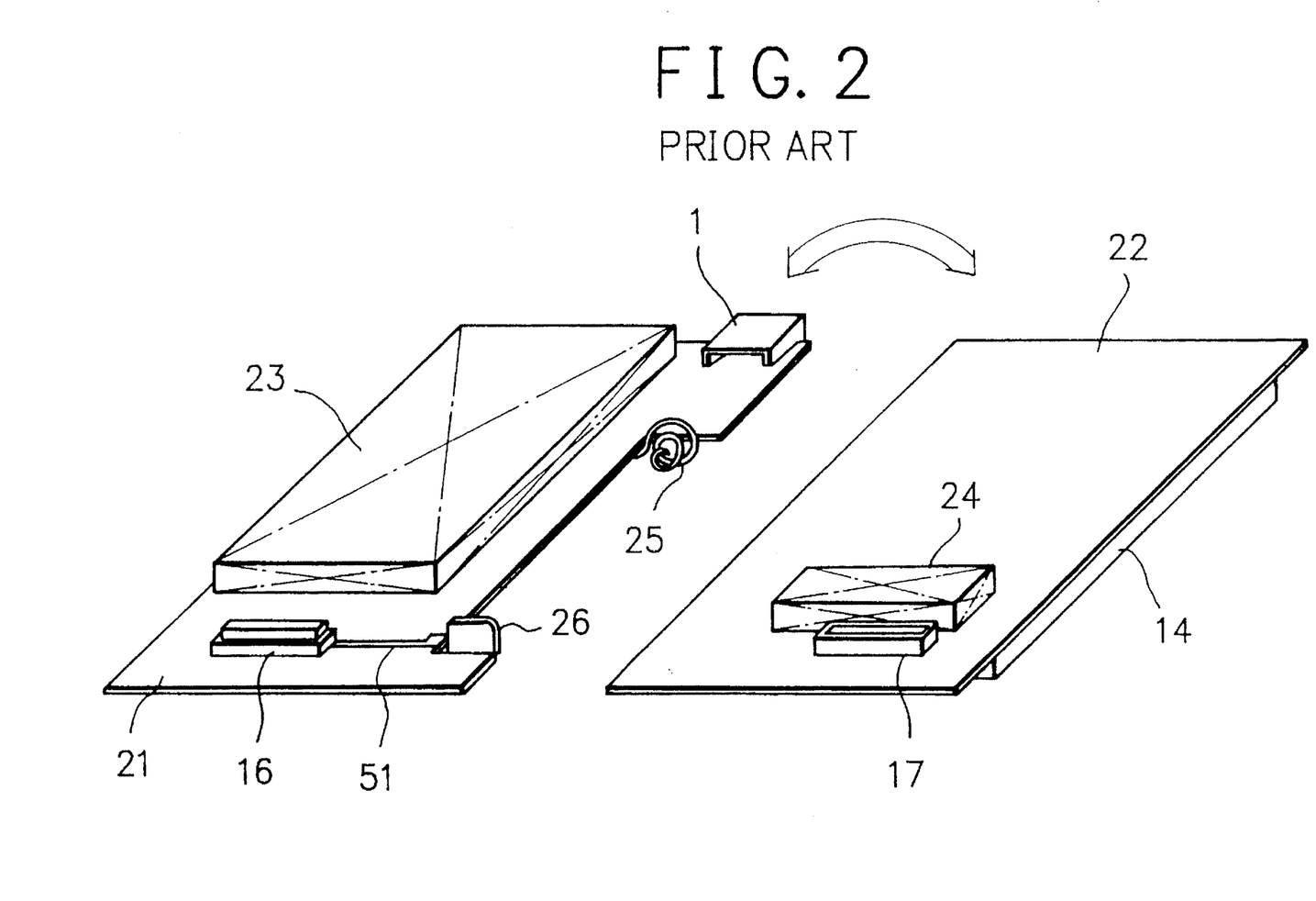
FIG. 2 is an exploded perspective view of the conventional radio selective call receiver shown in FIG. 1, mounted on printed circuit boards.
Figure 3:
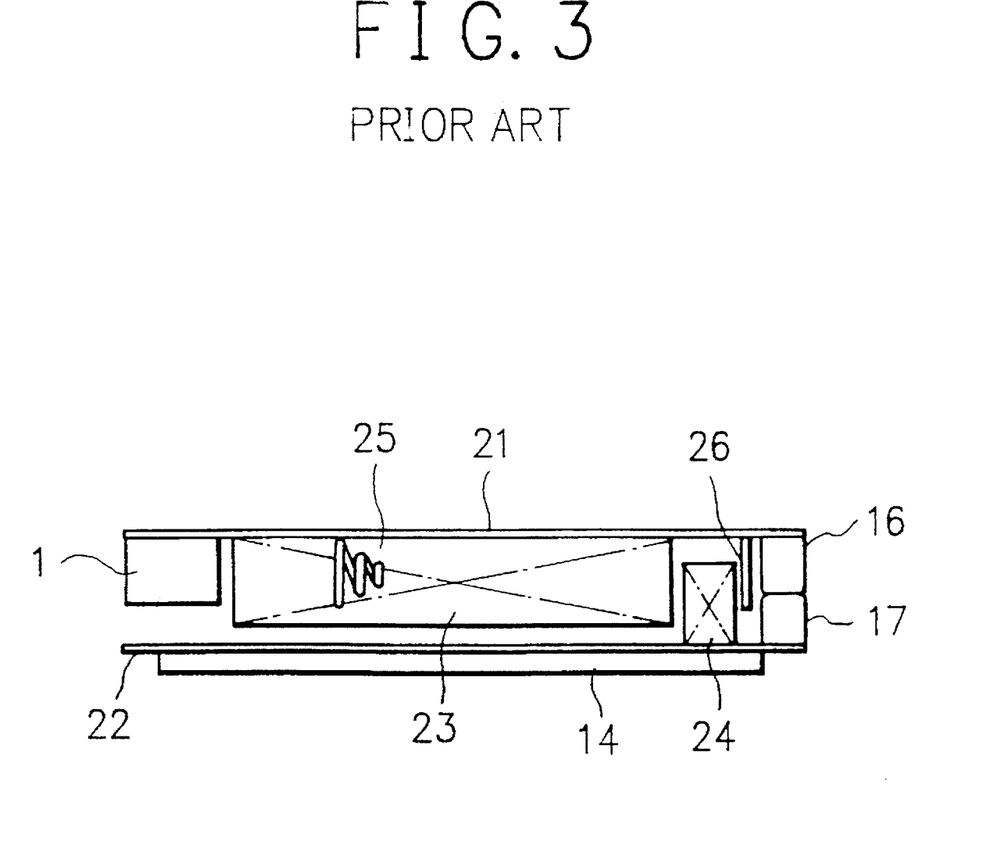
FIG. 3 is a side view of the conventional radio selective call receiver shown in FIG. 2, wherein two printed circuit boards are overlapped with each other.

FIG. 2 shows an exploded view of the conventional radio selective call receiver assembled on circuit boards. A component mounting part 23 including the antenna 1, the radio section 2 and the like, and the jack 16 are mounted on a printed circuit board 21 and a pair of positive and negative terminals 26 and 25 for connecting the battery 15 is also mounted. The plug 17 (to be connected with the jack 16 mounted on the printed circuit board 21) and a component mounting part 24 (including the display drive circuit 13 and the like) are mounted, on another printed circuit board 22 to be overlapped with the printed circuit board 21. The display 14 is mounted on the surface part of the printed circuit board 22. FIG. 3 illustrates the printed circuit boards 21 and 22 in their overlapped state wherein the jack 16 is coupled to the plug 17. In this connection state, the printed circuit boards 21 and 22 are assembled so that the concave and convex surfaces of the component mounting parts 23 and 24 are mutually engaged.

A power source pattern 9B formed on the printed circuit board 21 supplies the power of the battery 15 to the opposite printed circuit board 22 side via the jack 16 and the plug 17. The impedance of the power source pattern 9B is the same as an earth pattern.

In a convention 150 MHz band radio selective call a receiver, as disclosed in the U.S. Pat. No. 4,491,978 (Japanese Patent Publication No. 62-42534), by inserting a choke coil in series between a power source pattern and an earth pattern to connect the high frequency part operated at a frequency tuned with an antenna circuit and the low frequency part operated at a lower frequency than the frequency for the high frequency part, an earth line of the low frequency part will possess a high impedance with respect to the antenna, and the open area of the antenna can be substantially increased to reduce an antenna loss and to obtain high gain. That is, the gain reduction of the antenna under the influence of the low frequency part can be prevented.

In the conventional UHF band radio selective call receiver, when current having a frequency tuned with the antenna circuit flows through a non-negligible conductor, such as the power source pattern an electro magnetic field If this field is located near or within an opening of the antenna, the resulting magnetic field will deteriorate an antenna property. That is, the antenna gain is reduced by the influence of the conductor pattern.

In this UHF band radio selective call receiver, since a concentrated constant can not be used, it can be hard to improve the antenna property by using a choke coil different from the 150 MHz band radio selective call receiver.

SUMMARY OF THE INVENTION

It is therefore an object of the present invention to provide a radio selective call receiver which is capable of improving an antenna property such as antenna loss, preventing a generation of an unnecessary magnetic field, preventing a reduction of antenna gain and achieving a high density mounting of components on boards.

In accordance with one aspect of the present invention, there is provided a radio selective call receiver with a built-in antenna, comprising: a first circuit board provided with an antenna, an antenna tuning circuit connected to the antenna, and a high frequency circuit connected to the antenna tuning circuit and operating at a first frequency which is resonant with the antenna tuning frequency; a second circuit board provided with a low frequency circuit operating at a second frequency, lower than the antenna tuning frequency: and connection means including a microstrip line for connecting the first and second circuit boards, the microstrip line having a high impedance with respect to the antenna tuning frequency.

In the radio selective call receiver of the present invention, the first and second circuit boards are connected by a flexible circuit board and the microstrip line is formed on the flexible circuit board.

In the radio selective call receiver of the present invention, the microstrip line is shaped in a zigzag pattern, and magnetic fields generated by a current flowing in the microstrip line are mutually nullified.

According to the present invention, since the first circuit board on the high frequency side and the second circuit board on the low frequency side are connected by the connection means including the microstrip line having the high impedance with respect to the antenna tuning frequency, a loss at the antenna mounted on the first circuit board can be reduced. That is, an antenna gain reduction due to the current flow within a conductor for connecting the first and second circuit boards can be prevented.

Further, according to the present invention, since the first and second circuit boards are connected by the flexible circuit board provided with the microstrip line, the antenna gain can be improved, and there is no need to form the microstrip line on the first circuit board to enable a high density mounting of the first circuit board.

Furthermore, since the microstrip line is formed in zigzag so as to mutually nullify the magnetic fields generated by the current flowing in the zigzag pattern, a generation of an unnecessary magnetic field for giving an influence to the antenna property can be prevented.

BRIEF DESCRIPTION OF THE DRAWINGS

The objects, features and advantages of the present invention will become more apparent from the consideration of the following detailed description, taken in conjunction with the accompanying drawings, in which.

DESCRIPTION OF THE PREFERRED EMBODIMENTS

Figure 4:
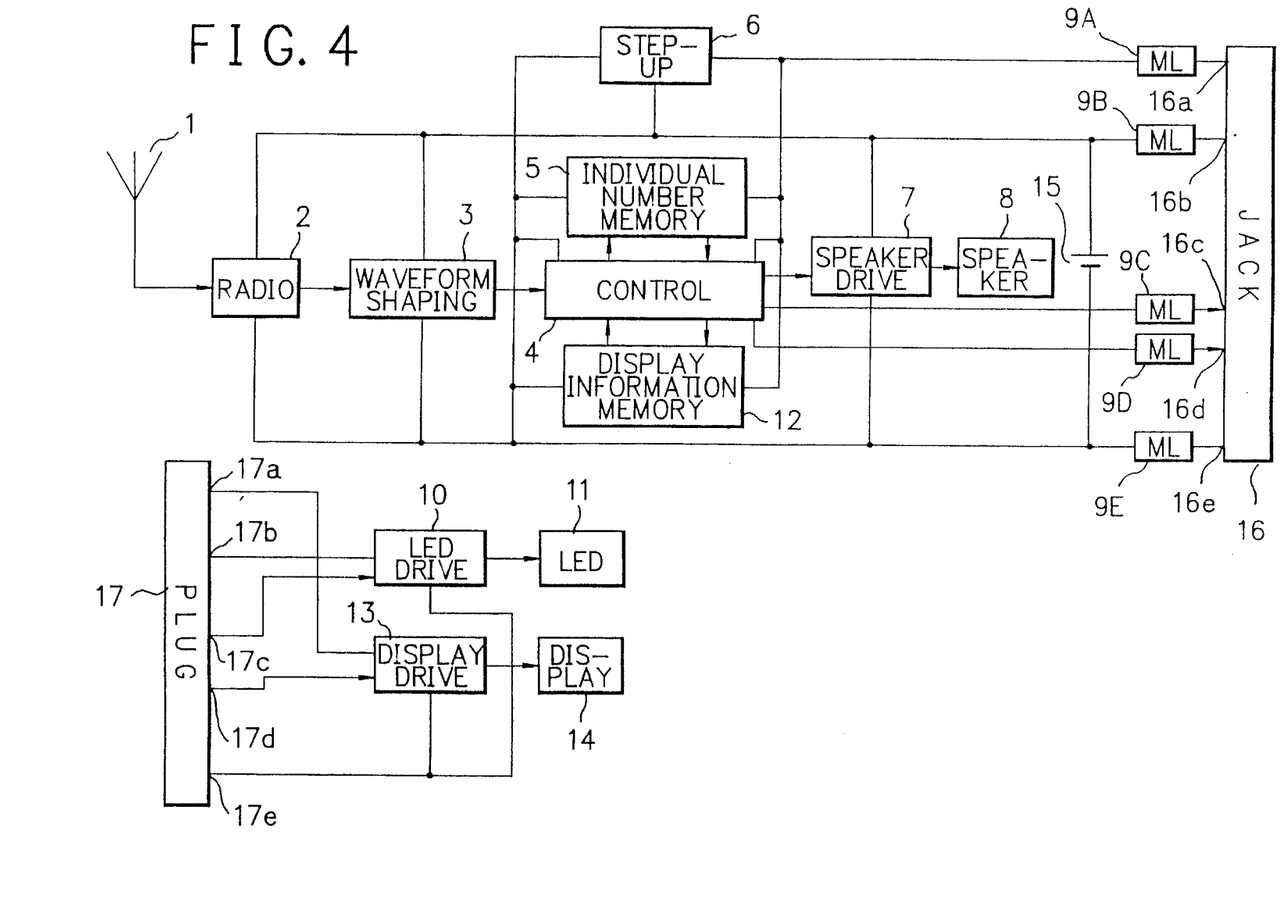
FIG. 4 is a block diagram of one embodiment of a radio selective call receiver according to the present invention.

Referring now to the drawings, wherein like reference characters designate like or corresponding parts throughout the views and thus the repeated description thereof can be omitted for brevity, there is shown in FIG. 4 one embodiment of a UHF band radio selective call receiver according to the present invention.

In FIG. 4, a UHF band radio signal received by an antenna 1 is amplified in a radio section 2 including an antenna tuning circuit and a high frequency circuit and is then demodulated in a waveform shaping section 3. In a control section 4, the demodulated signal output from the waveform shaping section 3 is compared with a unique identification number stored in a readable individual number memory 5, and when they are match a sound signal is applied a speaker drive circuit 7 and a light signal is also output to an LED drive circuit 10 via a microstrip line (ML) 9C, a terminal 16c of a jack 16 and a terminal 17c of a plug 17. The speaker drive circuit 7 amplifies the input sound signal to drive a speaker 8 to generate a call sound, and the LED drive circuit 10 amplifies the light signal to flash an LED 11.

Further, when the received signal includes a display information signal, the control section 4 picks it up and outputs it to a display drive circuit 13 via a microstrip line 9D, a terminal 16d of the jack 16 and a terminal 17d of the plug 17. The display drive circuit 13 converts the display information signal into a signal required for a code conversion and a display to display on a display 14. The display information for the display information signal is stored in a display information memory 12.

A battery 15 supplies an electric power to the circuit parts such as the radio section 2 and the like and to the LED drive circuit 10 via a microstrip line 9B, a terminal 16b of the jack 16 and a terminal 17b of the plug 17. Also, the voltage of the battery 15 is raised to a necessary voltage in a step-up circuit 6, and the step-up circuit 6 supplies the raised voltage to the control section 4 and the like and to the display drive circuit 13 via a microstrip line 9A, a terminal 16a of the jack 16 and a terminal 17a of the plug 17.

An earth line ground of a printed circuit board 21 is connected to an earth line of printed circuit board 22 via a microstrip line 9E, a terminal 16e of the jack 16 and a terminal 17e of the plug 17.

Figure 5:
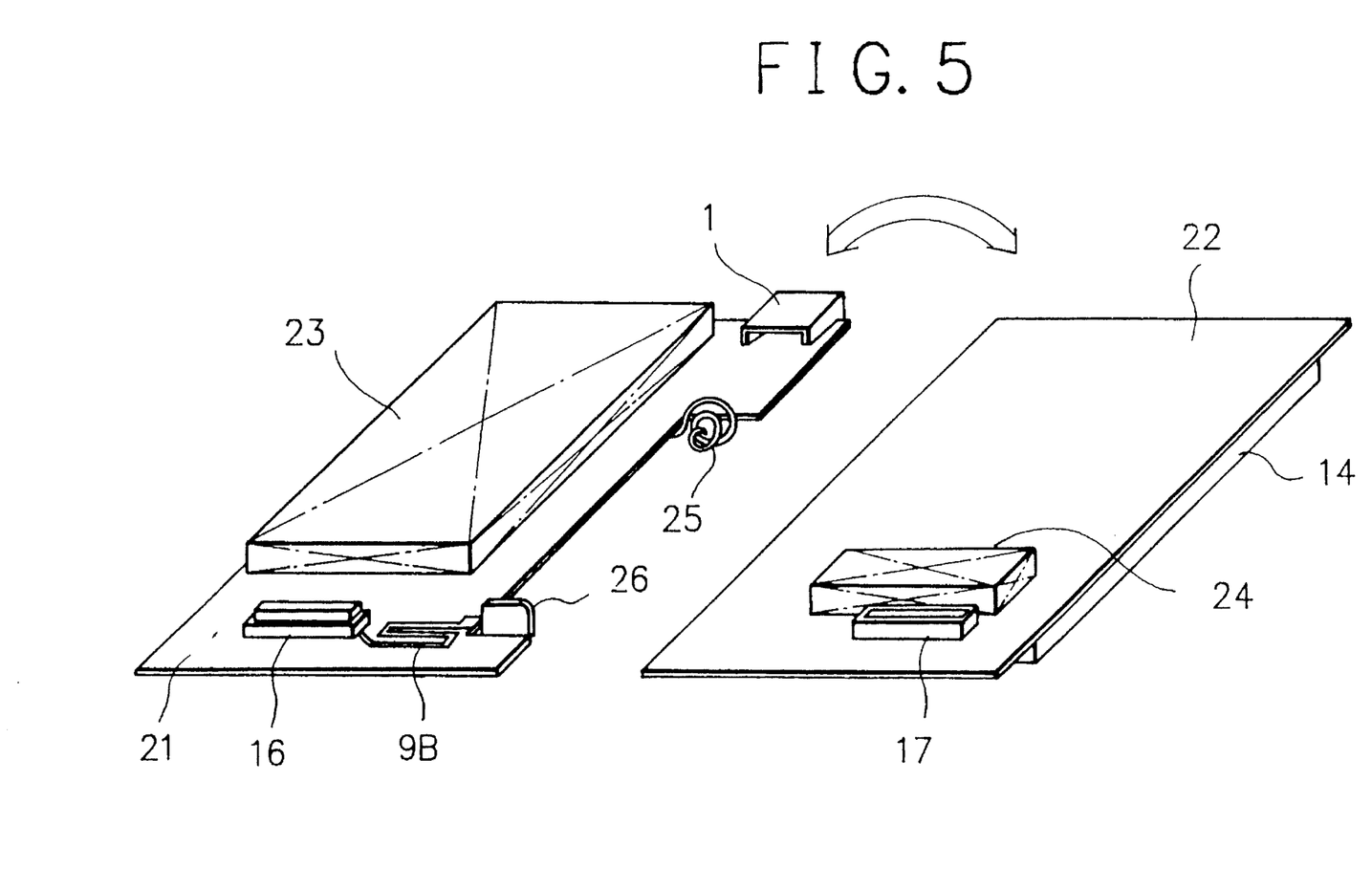
FIG. 5 is an exploded perspective view of the radio selective call receiver shown in FIG. 4, mounted on printed circuit boards.
Figure 6:
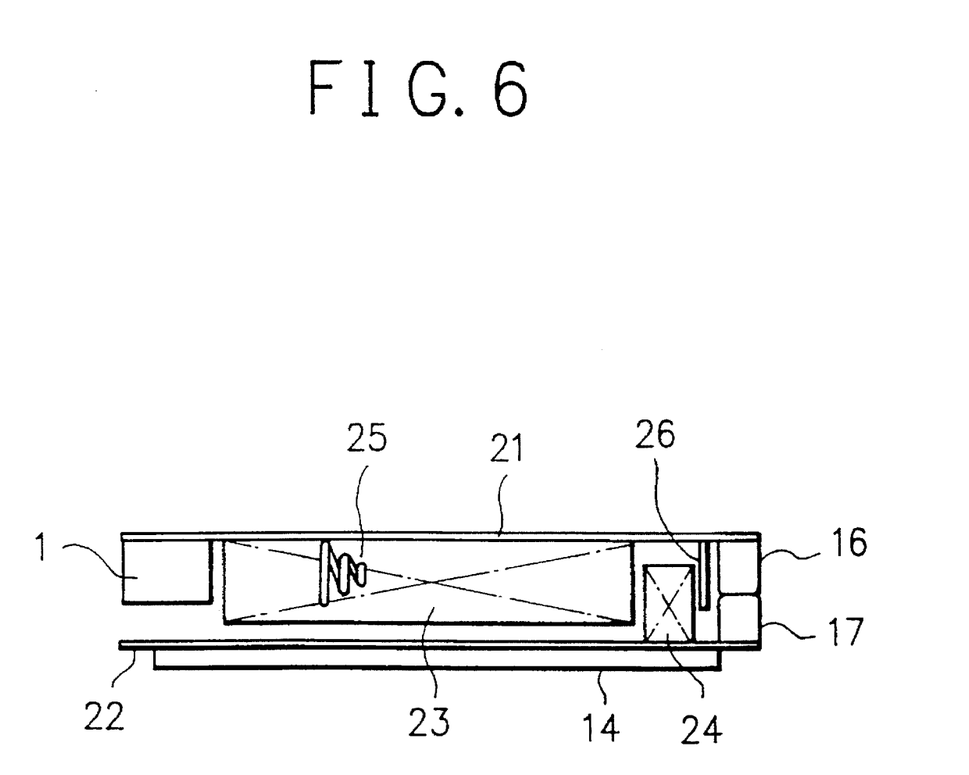
FIG. 6 is a side view of the radio selective call receiver shown in FIG. 5, wherein two printed circuit boards are overlapped with each other.

FIG. 5 shows the exploded structure of a UHF band radio selective call receiver mounted on the printed circuit boards 21 and 22, and FIG. 6 shows the overlapped printed circuit boards 21 and 22 connected with each other.

In FIGS. 5 and 6, a component mounting part 23 (including the antenna 1, the radio part 2 and the like, and the jack 16 are mounted on the printed circuit board 21 which includes the high frequency circuit. A pair of positive and negative terminals 26 and 25 for connecting the battery 15,) is also mounted on board 21. The printed circuit board 22 contains the low frequency circuit and is connected to the printed circuit board 21. A plug 17 (to be connected with the jack 16 mounted on the printed circuit board 21) and a component mounting part 24 (including the display drive circuit 13 operated of a lower frequency than an antenna tuning frequency and the like) are mounted on one side of the board 21. A display 14 is mounted on the surface part of the printed circuit board 22. A part of a power source pattern extending from the positive terminal 26 is constituted by the microstrip line 9B, and the power of the battery 15 is supplied to the printed circuit board 22 side via the microstrip line 9B, the terminal 16b of the jack 16 and the terminal 17b of the plug 17.

In this case, the microstrip line 9B is shaped in a zigzag pattern so that, when current flows, the magnetic field generated is mutually nullified so as to prevent the generation of magnetic fields which influence the antenna, and, by optimizing its line path length, a create high impedance with respect to the antenna tuning frequency to reduce the high frequency component of the field.

Also, the other microstrip lines 9A, 9C, 9D and 9E (not shown) have a similar function to the microstrip line 9B.

The microstrip lines 9A, 9B, 9C, 9D and 9E are composed of a wiring pattern formed on the printed circuit board 21, and thus no particular cost is required for formation of the microstrip lines.

Further, by using a multi-layer printed circuit board for the printed circuit board 21 and arranging the microstrip lines 9A, 9B, 9C, 9D and 9E in an internal layer, a high density mounting of the printed circuit board 21 can be obtained.

In this case, when the lines including the terminals of the jack 16 and the plug 17 have the high impedance with respect to the antenna tuning frequency and the magnetic field generated by the lines do not any influence to the antenna property, the microstrip lines can be deleted.

Figure 7:
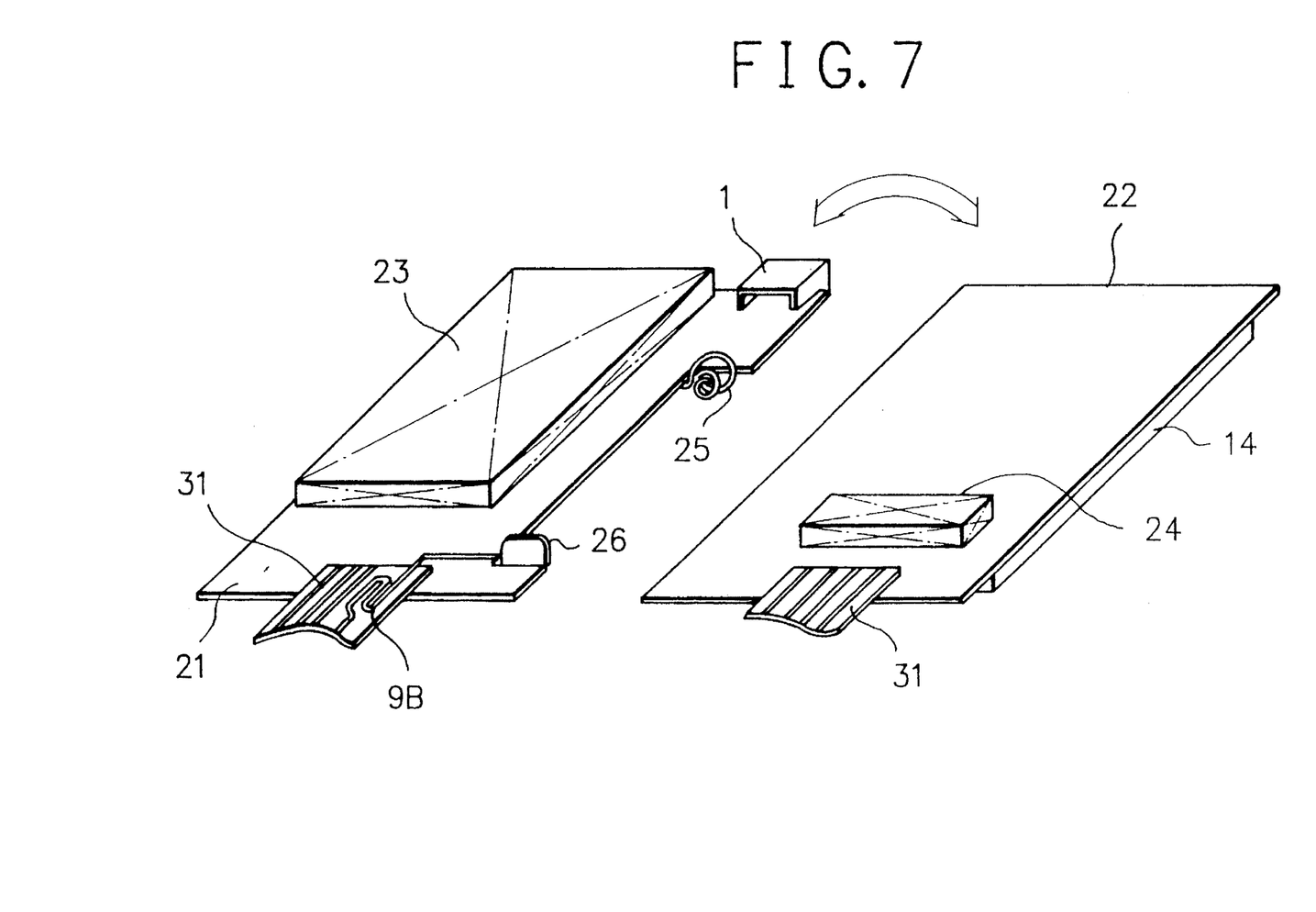
FIG. 7 is an exploded perspective view of another embodiment of a radio selective call receiver according to the present invention, mounted on printed circuit boards.
Figure 8:
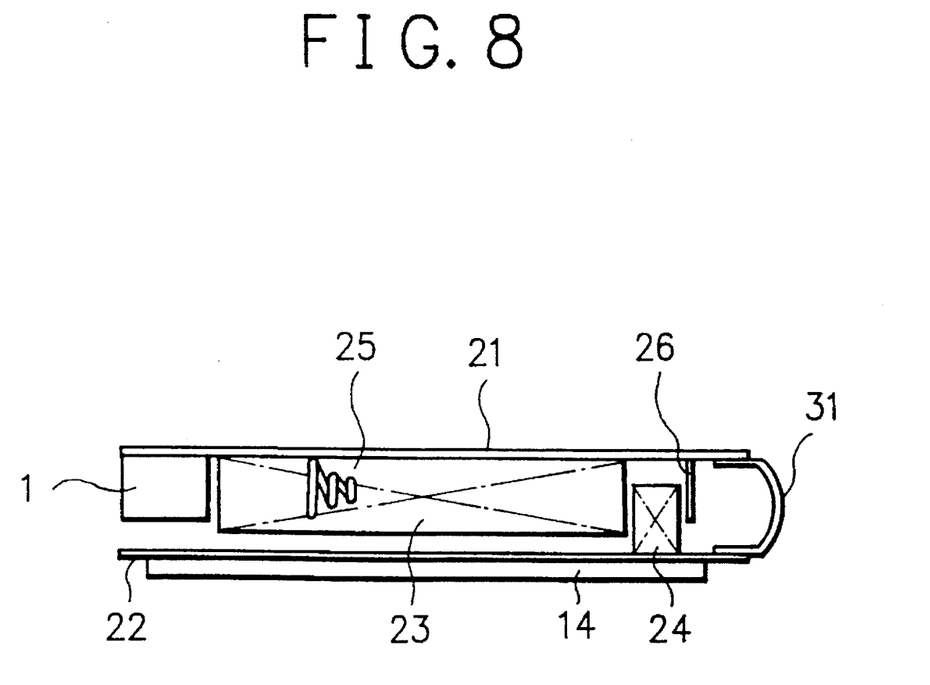
FIG. 8 is a side view of the radio selective call receiver shown in FIG. 7, wherein two printed circuit boards are overlapped with each other.

Next, in FIGS. 7 and 8, there is shown another embodiment of a UHF band radio selective call receiver according to the present invention.

In this embodiment, a flexible circuit board 31 is used for connecting the printed circuit boards 21 and 22 in place of the jack 16 and the plug 17. The flexible circuit board 31 is composed of patterns including a power source line, an earth line and signal lines, and in particular, the power source line is composed of a pattern including the microstrip line 9B.

As described above, in this embodiment, the printed circuit boards 21 and 22 are coupled by the flexible circuit board 31 and the microstrip line 9B is formed in the flexible circuit board 31. Hence, there is no need to form the microstrip line 9B on the printed circuit board 21 and it is possible to achieve the high density mounting of the printed circuit board 21.

According to the present invention, as described above, since the connection patterns such as the power source pattern for supplying the power of the battery provided on a first printed circuit board to a second printed circuit board connected to the first printed circuit board are constructed by the microstrip lines, the disturbance of the magnetic field near the antenna due to the current flowing in the connection patterns can be prevented to raise the antenna gain compared with a conventional radio selective call receiver.

Further, by using the flexible circuit board for the coupling of the two printed circuit boards, the microstrip lines can be formed on the flexible circuit board, and thus the high density mounting of the printed circuit board can be possible. As a result, a compact radio selective call receiver with a high gain antenna can be constructed.

Further, by forming the microstrip line in zigzag, the magnetic field generated by the flowing of the current in the microstrip line can be nullified, and the generation of the unnecessary magnetic field for giving an influence to the antenna property can be prevented. As a result, the antenna gain can be further raised.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio selective call receiver, comprising:
   a first circuit board on which are mounted an antenna, an antenna tuning circuit connected to the antenna and operating at an antenna tuning frequency, and a high frequency circuit connected to the antenna tuning circuit, the high frequency circuit operating at a first frequency which is resonant with the antenna tuning frequency of the antenna tuning circuit;
   a second circuit board having a low frequency circuit mounted thereon and operating at a second frequency lower than the antenna tuning frequency; and
   connection means for connecting the first and second circuit boards to each other and for electrically connecting the high frequency circuit and the low frequency circuit to each other, the connection means including a microstrip line in a zigzag pattern along a substantially flat plane to mutually nullify magnetic fields generated when current flows through the microstrip line, the zigzag pattern being formed by only three parallel lengthwise microstrip line portions, the microstrip line having a high impedance with respect to the antenna tuning frequency.

2. The radio selective call receiver as claimed in claim 1, wherein the first circuit board is a multi-layer circuit board, and the microstrip line is arranged in an internal layer of the multilayer circuit board.

3. The radio selective call receiver as claimed in claim 1, wherein the connection means includes a flexible circuit board and the microstrip line is formed on the flexible circuit board.

4. A radio selective call receiver, comprising:
   a first circuit board on which are mounted:
   an antenna;
   an antenna tuning circuit connected to the antenna and operating at an antenna tuning frequency; and
   a high frequency circuit connected to the antenna tuning circuit and operating at a frequency which is resonant with the antenna tuning frequency of the antenna tuning circuit;
   a second circuit board on which is mounted a low frequency circuit operating at a frequency lower than the antenna tuning frequency; and
   the zigzag pattern being formed by only three parallel lengthwise microstrip line portions, a connector including a microstrip line in a zigzag pattern, the connector providing an electrical connection between the high frequency circuit and the low frequency circuit, the electrical connection having a high impedance with respect to the antenna tuning frequency as the impedance is increased by the zigzag pattern of the microstrip line.

5. The radio selective call receiver as claimed in claim 4, wherein the zigzag pattern is disposed along a substantially flat plane including parallel legs to mutually nullify magnetic fields generated when current flows through the microstrip line.

6. The radio selective call receiver as claimed in claim 5, wherein the connector includes a flexible circuit board for interconnection between the first and second circuit boards, the flexible circuit board having the substantially flat plane on either side thereof when extended.

7. The radio selective call receiver as claimed in claim 5, wherein one of the first and second circuit boards has the substantially flat plane on either side thereof.

* * * * *